(12) United States Patent
Lin et al.

(10) Patent No.: US 8,780,333 B2
(45) Date of Patent: Jul. 15, 2014

(54) RANGE FINDER

(71) Applicant: Asia Optical International Ltd., Tortola (GB)

(72) Inventors: Chen-Yeh Lin, Taichung (TW); Chia-Chi Tang, Taichung (TW)

(73) Assignee: Asia Optical International Ltd., Tortola (VG)

( * ) Notice: Subject to any disclaimer, the term of this patent is extended or adjusted under 35 U.S.C. 154(b) by 132 days.

(21) Appl. No.: 13/670,575

(22) Filed: Nov. 7, 2012

(65) Prior Publication Data
US 2013/0182240 A1 Jul. 18, 2013

(30) Foreign Application Priority Data
Jan. 12, 2012 (TW) .............................. 101101248 A

(51) Int. Cl.
*G01C 3/32* (2006.01)
*F41G 1/38* (2006.01)

(52) U.S. Cl.
CPC ... *G01C 3/32* (2013.01); *F41G 1/38* (2013.01)
USPC ............................................... 356/21; 356/9

(58) Field of Classification Search
CPC ........................... F41G 1/38; G01C 3/08–3/31
USPC ............. 356/3.01–3.15, 4.01–4.1, 5.01–5.15, 356/6–22, 28, 28.5
See application file for complete search history.

(56) References Cited

U.S. PATENT DOCUMENTS

| 2007/0044364 A1* | 3/2007 | Sammut et al. ................. 42/122 |
| 2012/0186130 A1* | 7/2012 | Tubb .............................. 42/122 |

FOREIGN PATENT DOCUMENTS

| TW | 200624980 | 7/2006 |
| TW | 200804947 | 1/2007 |

OTHER PUBLICATIONS

Taiwan Search Report issued in corresponding TW101101248 issued on Feb. 10, 2014, (2 pages).

* cited by examiner

*Primary Examiner* — Luke Ratcliffe
(74) *Attorney, Agent, or Firm* — Trop, Pruner & Hu, P.C.

(57) ABSTRACT

A range finder adapted for finding the object distance of a subject having a specific height includes a shell unit, an objective lens assembly, a magnifying unit having multiple selectable magnification ratios, and a range finding unit. The range finding unit includes a scale, a pointer, and a mark. The object distance of the subject is known by comparing the scale and the pointer in an imaging plane when an end of an image of the specific height of the subject formed on the imaging plane is aligned with the mark.

10 Claims, 13 Drawing Sheets

US 8,780,333 B2

RANGE FINDER

CROSS-REFERENCE TO RELATED APPLICATION

This application claims priority to Taiwanese Application No. 101101248, filed on Jan. 12, 2012.

BACKGROUND OF THE INVENTION

1. Field of the Invention

The invention relates to a sight, and more particularly to a range finder.

2. Description of the Related Art

U.S. Pat. No. 4,263,719 discloses a sighting device for use as a telescope. The sighting device has a predetermined magnification ratio and a plurality of distance scales marking different distance values for comparing with an image of a subject.

Another laser sighting device is disclosed in US patent application publication No. 20060010762, which uses time difference between emission and reception of a laser beam to calculate distance from a subject. However, the laser sighting device needs to be equipped with a laser diode (LD) and an avalanche photodiode (APD) for emitting and receiving the laser beam, thereby resulting in greater volume and higher cost, and needs electrical power for distance calculation.

SUMMARY OF THE INVENTION

Therefore, an object of the present invention is to provide a range finder that is easy to use without the requirement of electrical power.

According to the present invention, a range finder is adapted for finding the distance of a subject from the range finder. The subject has a specific height. The range finder comprises:

a shell unit having an objective end and an eyepiece end;
an objective lens assembly disposed on the objective end, and forming a first imaging plane at a first focus position;
a magnifying unit disposed in the shell unit and between the objective end and the eyepiece end, the magnifying unit forming a second imaging plane behind the first imaging plane at a second focus position, and having a plurality of magnification ratios one of which is selected through operation of the magnifying unit; and
a range finding unit disposed in the shell unit, and including
  a first comparing component disposed at the first imaging plane and having a first reference point,
  a second comparing component disposed at the second imaging plane and having a second reference point,
  a scale formed on one of the first and second comparing components,
  a pointer formed on the other one of the first and second comparing components, and
  a mark formed on the second comparing component,
the scale having a plurality of distance graduations each corresponding to a respective one of the magnification ratios and representing an object distance value that is proportional to the respective one of the magnification ratios, the mark being spaced apart from the second reference point by a comparing height, such that when the magnifying unit is set to one of the magnification ratios to allow an image of the subject formed on the second imaging plane to have an image height that is substantially equal to the comparing height, the distance of the subject from the range finder is known by comparing the scale and the pointer that are observed on the second imaging plane.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
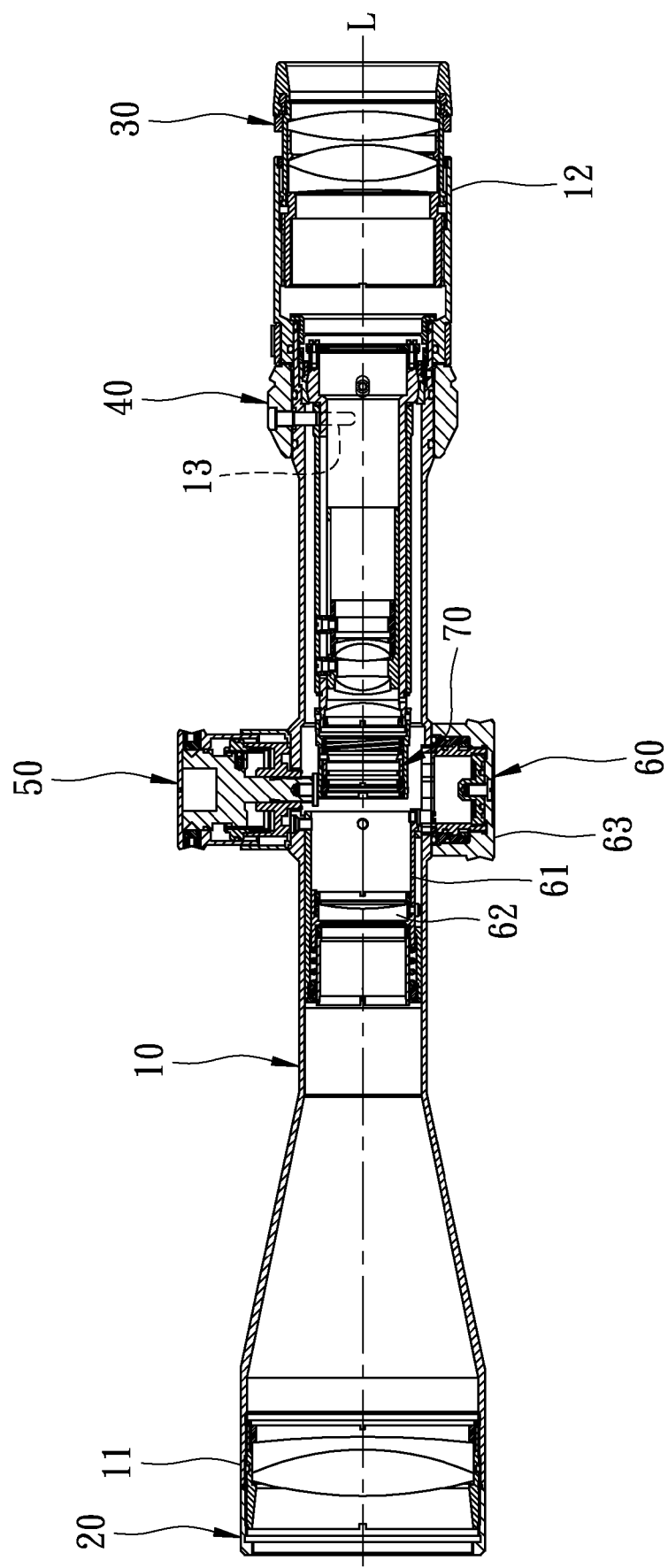
FIG. 1 is a sectional view of a first preferred embodiment of the range finder according to the present invention.
Figure 2:
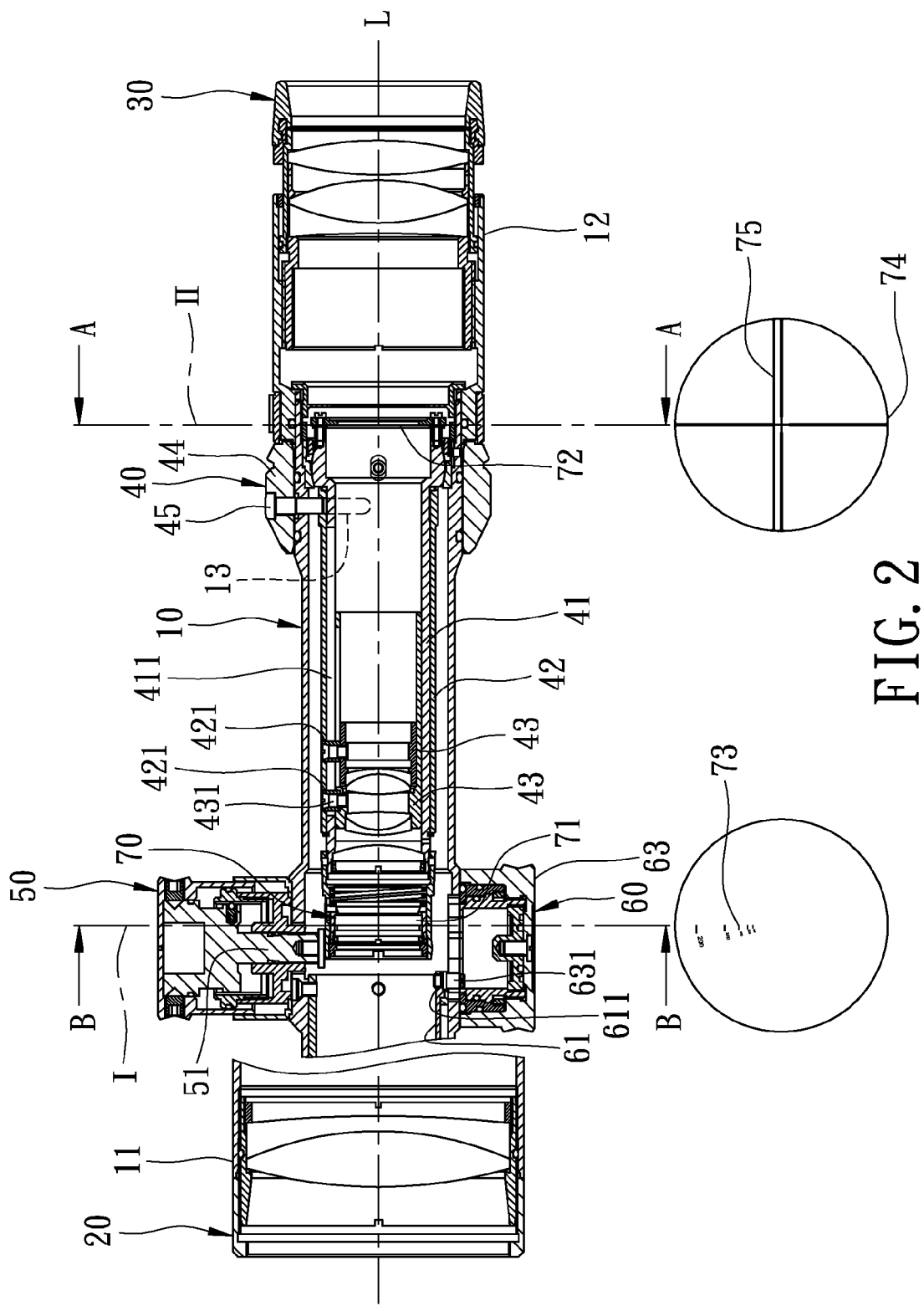
FIG. 2 is a fragmentary sectional view of the first preferred embodiment.
Figure 6:
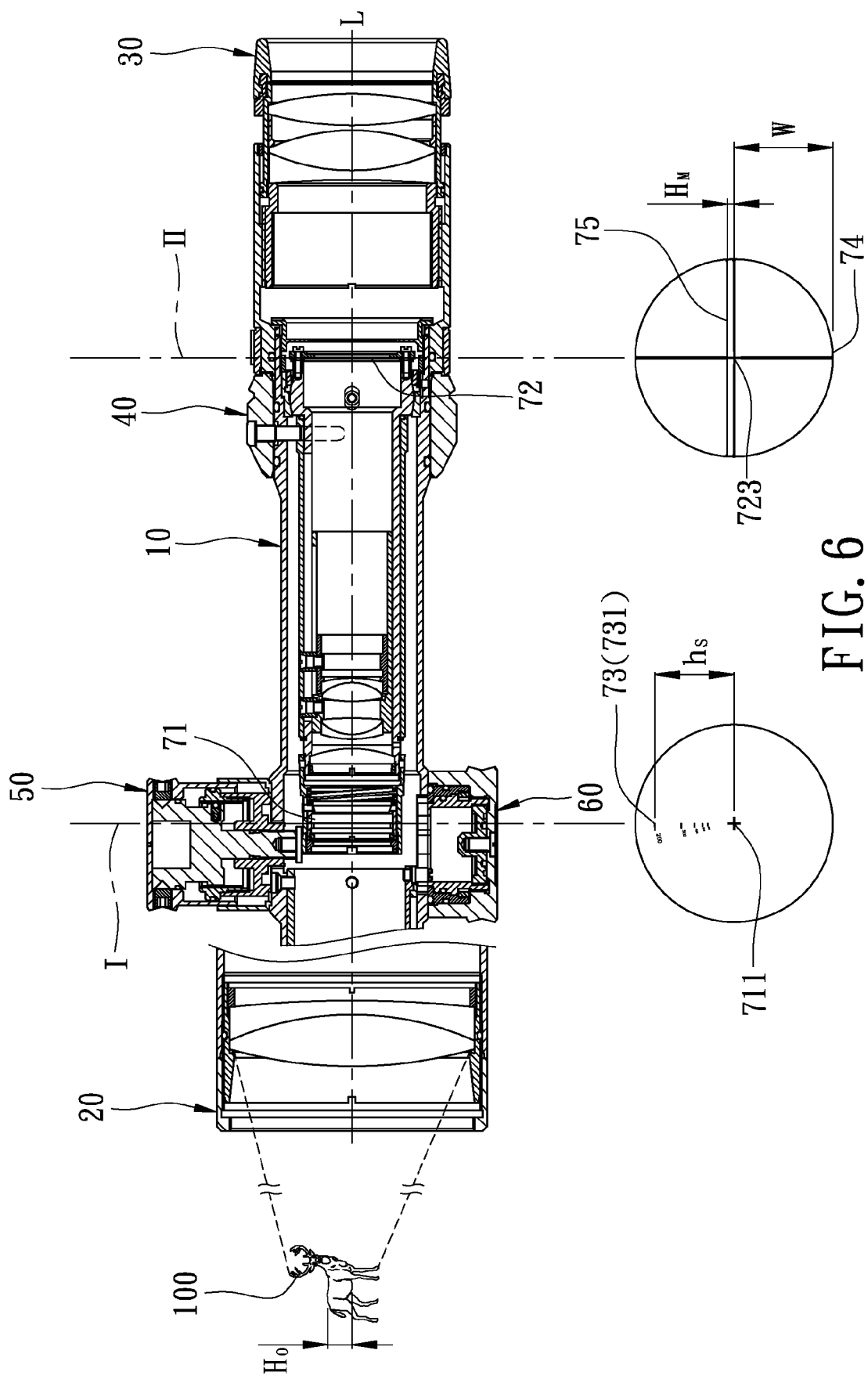
FIG. 6 is similar to FIG. 2 for illustrating a distance finding action performed on a subject.

Referring to FIGS. 1, 2, and 6, the first preferred embodiment of the range finder according to this invention is adapted for use on a subject 100 having a specific height $H_O$. The subject 100 herein is a deer, and the specific height $H_O$ refers to an average body height of the deer (16 inches in general). The range finder comprises a shell unit 10, an objective lens assembly 20, an eyepiece lens assembly 30, a magnifying unit 40, two impact-point correction units 50, a focal-length adjusting unit 60, and a range finding unit 70.

The shell unit 10 has an objective end 11, an eyepiece end 12 opposite to the objective end 11, and a circumferentially extending slot 13 disposed around an axial direction L of the shell unit 10.

The objective lens assembly 20 is disposed on the objective end 11, and forms a first imaging plane I at a first focus position.

The eyepiece lens assembly 30 is disposed on the eyepiece end 12 of the shell unit 10 for a user to adjust a diopter suitable for vision thereof and an appropriate magnification ratio.

The magnifying unit 40 is disposed in the shell unit 10 and between the objective end 11 and the eyepiece end 12. The magnifying unit 40 forms a second imaging plane II behind the first imaging plane I at a second focus position. The magnifying unit 40 has a plurality of magnification ratios X one of which is selected through operation thereof. In this embodiment, the magnification ratios X range between 5 to 15.

The magnifying unit 40 includes a first inner barrel 41 extending in the axial direction L of the shell unit 10 and swingably disposed in the shell unit 10, a second inner barrel 42 rotatably sleeved on the first inner barrel 41, a plurality of lenses 43 movable in the axial direction L in the first inner barrel 41, a magnification ratio adjusting ring 44 rotatably sleeved on the shell unit 10, and an adjusting pin 45 disposed on the magnification ratio adjusting ring 44. The adjusting pin 45 extends through the slot 13, and is connected to the second inner barrel 42. The first inner barrel 41 has a straight guiding groove 411. The second inner barrel 42 has a plurality of camming guiding grooves 421 each corresponding to a respective one of the lenses 43. Each lens 43 has a guiding pin 431 extending into the respective camming guiding groove 421 through the straight guiding groove 411.

In this embodiment, the first imaging plane I is disposed at a front end of the first inner barrel 41, and the second imaging plane II is disposed at a rear end of the first inner barrel 41.

In this invention, the user can change the magnification ratio X through rotation of the magnification ratio adjusting ring 44, so as to move the adjusting pin 45 within the slot 13, thereby resulting in rotation of the second inner barrel 42 relative to the first inner barrel 41. When the second inner barrel 42 rotates, walls defining the camming guiding grooves 421 move the lenses 43 toward or away from each other along the straight guiding groove 411 to thereby change the magnification ratio X of the magnifying unit 40.

Figure 5:
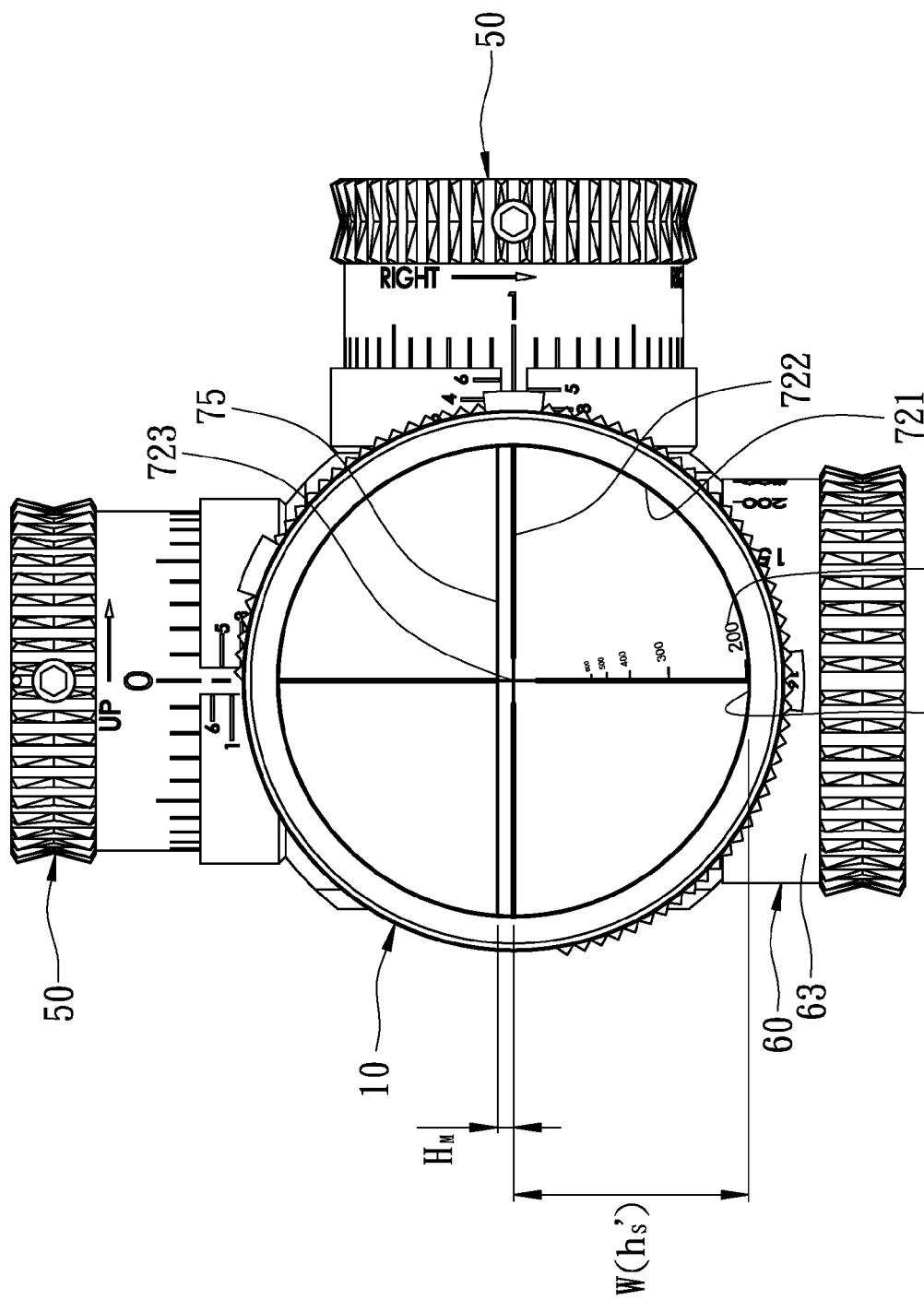
FIG. 5 is a rear view of FIG. 1.

As shown in FIG. 2 and FIG. 5, the impact-point correction units 50 are disposed respectively on the top side and the right side of the shell unit 10. Each impact-point correction unit 50 includes an adjusting component 51 that extends into the shell unit 10 and abuts against the front end of the first inner barrel 41. In this embodiment, when the range finding action is completed, the user can rotate the adjusting component 51 at the top side to swing the first inner barrel 41 up and down to correct vertical deviation between the sighted position of the invention and the actual impact point. In the same way, the user can rotate the adjusting component 51 at the right side to swing the first inner barrel 41 leftwardly and rightwardly to correct horizontal deviation between the sighted position of the invention and the actual impact point.

The focal length adjusting unit 60 is disposed on the shell unit 10, and has a focal-length adjusting barrel 61 that is movably disposed in the shell unit 10 and in front of the first imaging plane I, a focusing lens 62 (see FIG. 1) disposed on the focal-length adjusting barrel 61, and a focal-length adjusting knobset 63 rotatably disposed on the shell unit 10. The focal-length adjusting knobset 63 is operable to drive rectilinear movement of the focal-length adjusting barrel 61. In this embodiment, the focal-length adjusting barrel 61 has a camming groove 611, and the focal-length adjusting knobset 63 has a knob guiding pin 631 engaged within the camming groove 611. When rotating the knobset 63, the knob guiding pin 631 moves in the camming groove 611 to move the focal-length adjusting barrel 61 and the focusing lens 62 in the axial direction L in the shell unit 10. After completion of the range finding action, the user can rotate the knobset 63 to a corresponding distance mark (such as 200, 300, 400, 500, and 600 yards) to move the focusing lens 62 to a specific position, so as to change the focal length of the objective lens assembly 20, thereby allowing the user to clearly see the subject 100 (as shown in FIG. 6).

Figure 3:
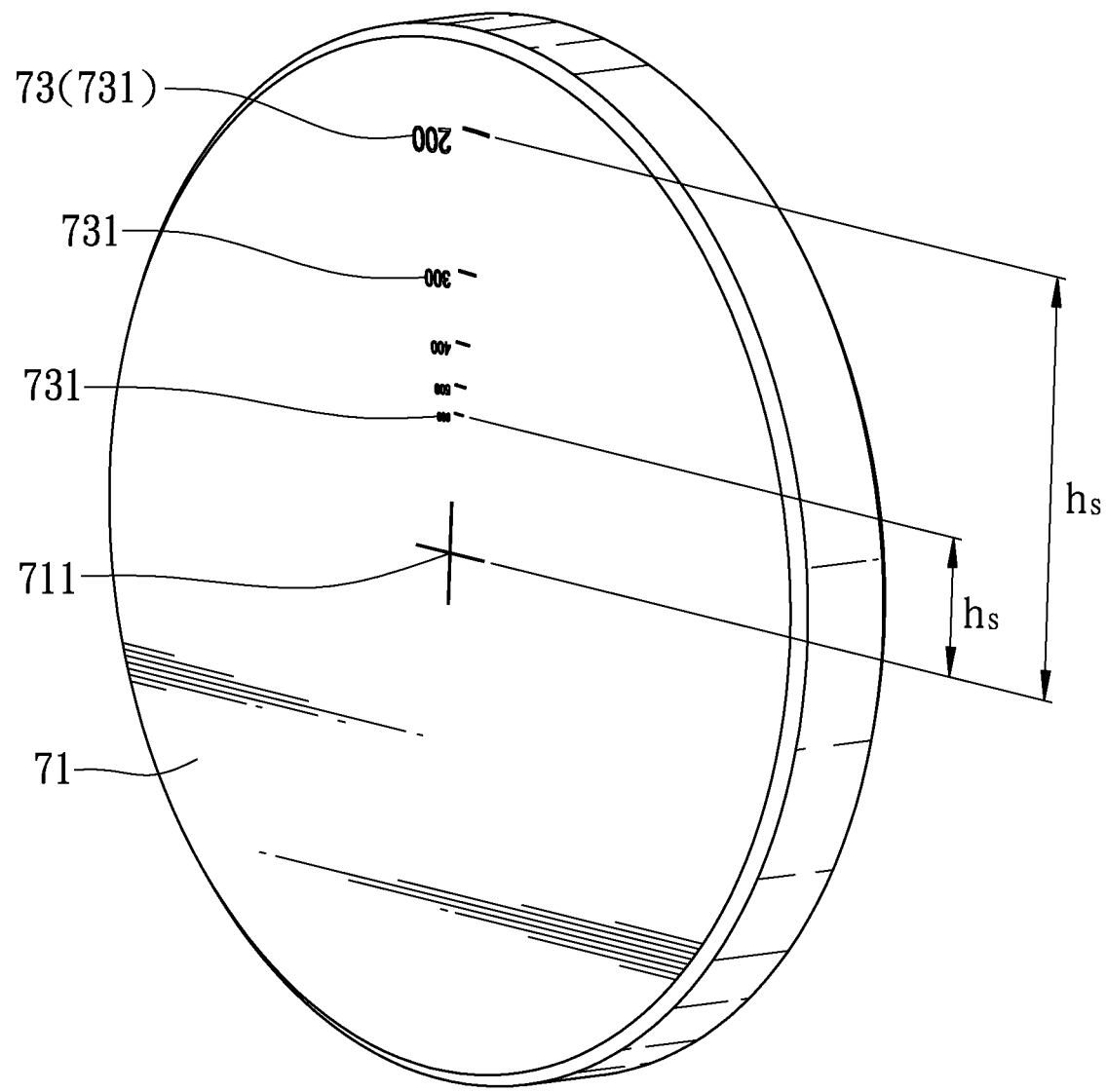
FIG. 3 is a perspective view showing a first comparing component of the first preferred embodiment.
Figure 4:
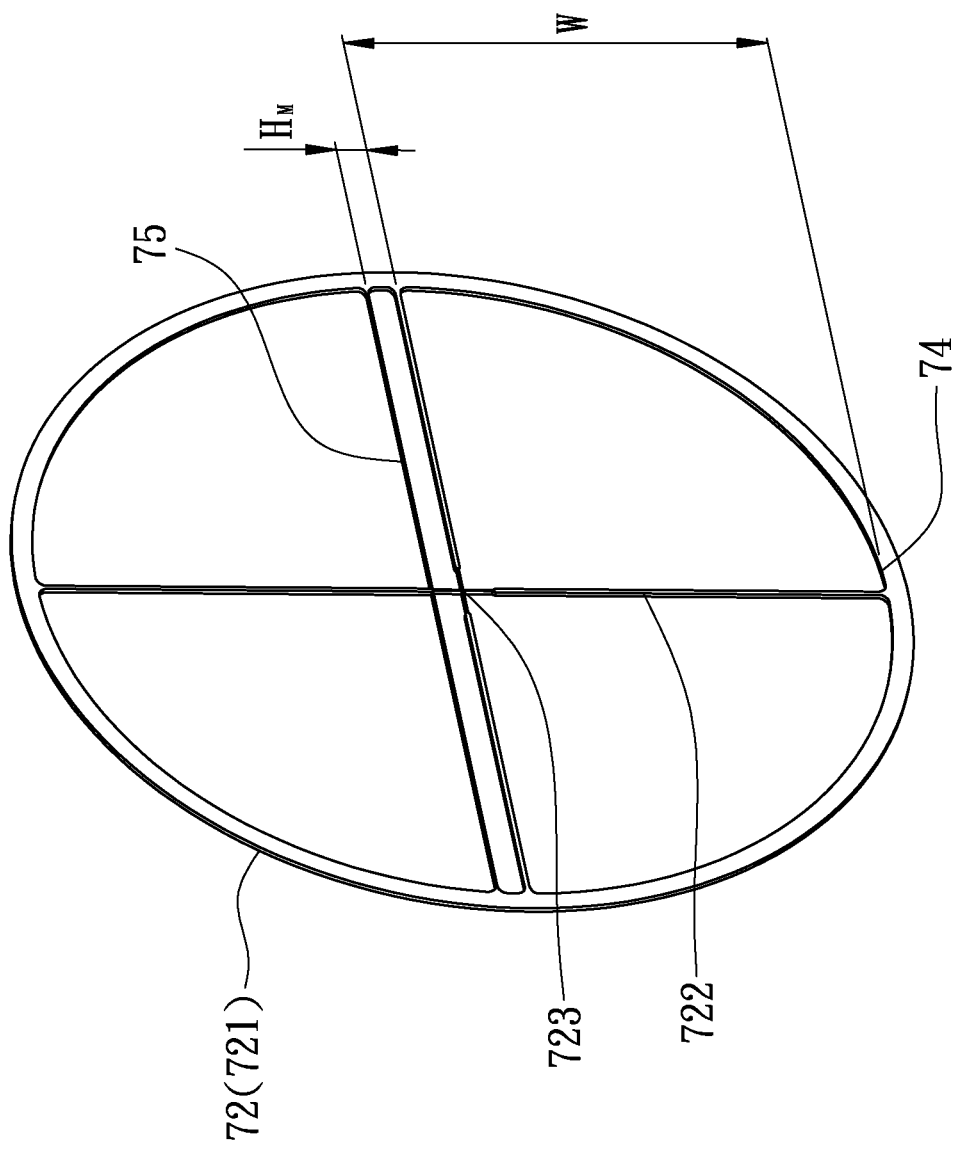
FIG. 4 is a perspective view showing a second comparing component of the first preferred embodiment.

Referring to FIGS. 2, 3, and 4, the range finding unit 70 is disposed in the shell unit 10, and includes a first comparing component 71 disposed at the first imaging plane I, a second comparing component 72 disposed at the second imaging plane II, a scale 73 formed on the first comparing component 71, a pointer 74 formed on the second comparing component 72, and a mark 75 formed on the second comparing component 72.

The first comparing component 71 has a first reference point 711. In this embodiment, the first comparing component 71 is a glass lens.

The second comparing component 72 has an outer ring 721, a reticle 722 connected to and disposed in the outer ring 721, and a second reference point 723. In this embodiment, the second comparing component 72 is a cross sight, and the second reference point 723 is disposed at an intersection of the reticle 722.

The scale 73 has a plurality of distance graduations 731 each corresponding to a respective one of the magnification ratios X and representing an object distance value that is proportional to the corresponding magnification ratio X. Each distance graduation 731 is spaced apart from the first reference point 711 by a respective first distance $h_S$.

In this embodiment, the distance graduations 731 of the scale 73 are non-equidistantly arranged in a radial direction, and the object distance values that are represented by the distance graduations 731 decrease outwardly. The object distance values that are represented by the distance graduations 731 are 200, 300, 400, 500, and 600 yards from outside to inside, respectively, and are proportional to the magnification ratios X as shown in the table below:

| Object distance Value (yard) | Magnification Ratio X |
|---|---|
| 200 | 5 |
| 300 | 7.5 |
| 400 | 10 |
| 500 | 12.5 |
| 600 | 15 |

The first distances $h_S$ between the distance graduations 731 and the first reference point 711 are inversely proportional to the magnification ratios X including 5, 7.5, 10, 12.5, and 15. Moreover, the font sizes of the distance graduations 731 are also inversely proportional to the magnification ratios X including 5, 7.5, 10, 12.5, and 15 and are disposed upside down.

The pointer 74 is formed on an inner periphery of the outer ring 721 of the second comparing component 72. The pointer 74 is spaced apart from the second reference point by a second distance W.

In this embodiment, when a magnification ratio X is set, the first distance $h_S$ between a corresponding distance graduation 731 and the first reference point 711 forms an imaging distance $h_S'$ (see FIG. 7) on the second imaging plane II that is substantially equal to the second distance W, so that any one of the distance graduations 731 can be aligned with the pointer 74 on the second imaging plane II in the corresponding magnification ratio X.

The mark 75 is spaced apart from the second reference point 723 by a comparing height $H_M$. In this embodiment, the mark 75 is connected to the outer ring 721 and the reticle 722, and is disposed above the horizontal line of the reticle 722.

When the magnifying unit 40 is set to one of the magnification ratios X, an image of the subject 100 formed on the second imaging plane II has an image height $h_O'$ that is substantially equal to the comparing height $H_M$.

Figure 7:
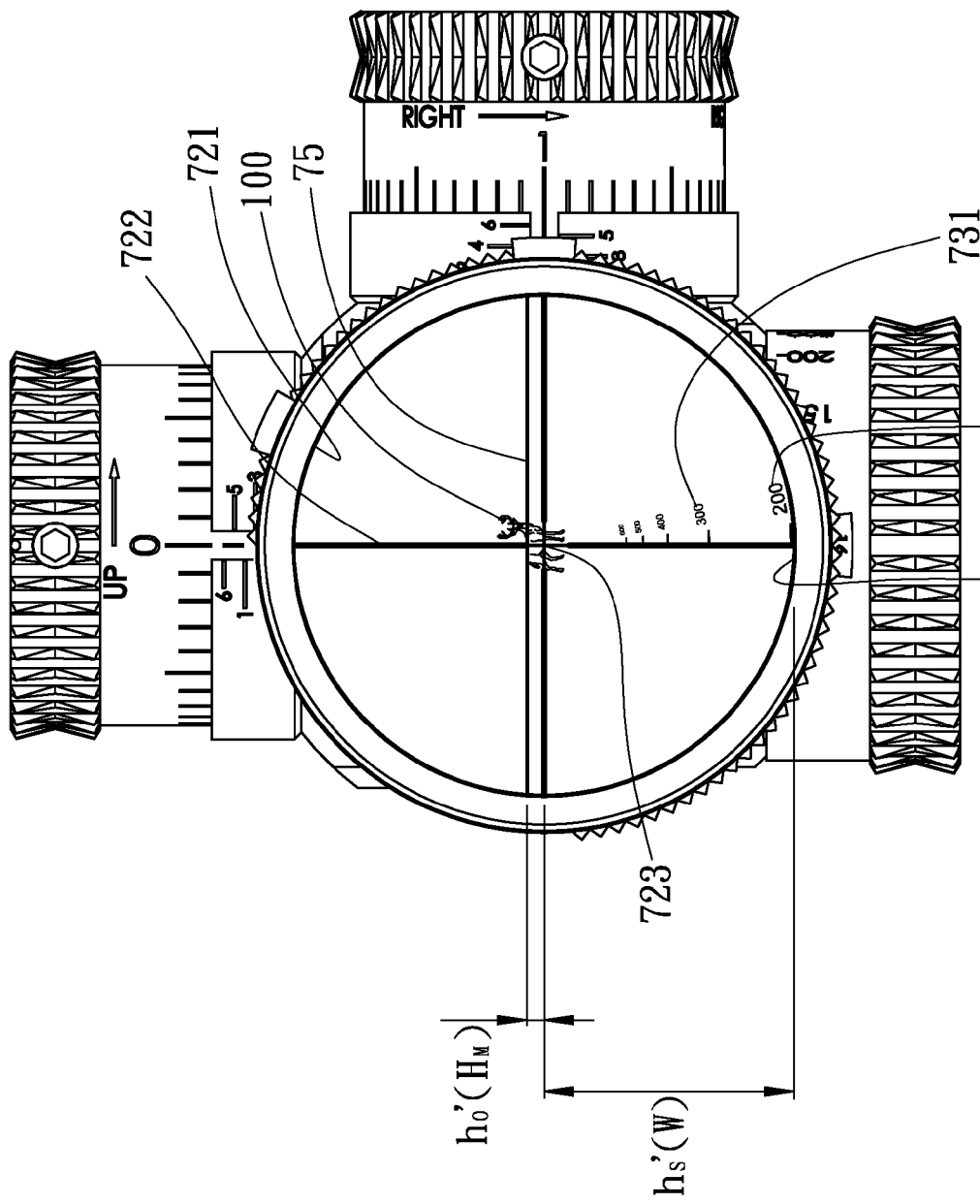
FIG. 7 is a rear view of FIG. 6.

As shown in FIGS. 6 and 7, through a general imaging formula "image distance/object distance=image height/object height", the relationship between the specific height $H_O$ of the subject 100 and the comparing height $H_M$ can be expressed by the following formula:

$$h'_O = h_O \times \frac{d_2}{D_2} \times X = H_O \times \frac{d_1}{D_1} \times \frac{d_2}{D_2} \times X$$

where $H_O$ is a specific height of the subject 100;

$h_O$ is an image height of the specific height $H_O$ of the subject 100 formed on the first imaging plane I;

$h_O'$ is an image height of the specific height $H_O$ formed on the second imaging plane II, and is also an image height of the image height $h_O$ formed on the second imaging plane II;

d2 is an image distance when the image height ho is imaged on the second imaging plane II;

D2 is an object distance when the image height ho is imaged on the second imaging plane II;

d1 is an image distance when the specific height $H_O$ is imaged on the first imaging plane I;

D1 is an object distance when the specific height $H_O$ is imaged on the first imaging plane I; and X is one of the magnification ratios.

In this formula: the specific height $H_O$ of the subject 100 is known (16 inches in general); assuming the subject 100 is spaced apart by an object distance (such as 200 yards), the image distance d1 and the object distance D1 that are associated with the subject 100 and relative to the first imaging plane I are known; the image distance d1 and the object distance D1 that are associated with the image height $h_O$ and relative to the second imaging plane II are known; and the corresponding magnification ratio X (5) is known. Therefore, the image height $h_O'$ of the specific height $H_O$ formed on the second imaging plane II can be obtained, so that the comparing height $H_M$ is determined.

In the same way, when the subject 100 is assumed to be spaced apart by a different object distance (such as 300, 400, 500, or 600 yards), since the image distances d1, d2 and the object distances D1, D2 are known, the corresponding magnification ratio X is set according to the predetermined comparing height $H_M$, such that each of the image heights $h_O'$ can be made equal to the comparing height $H_M$ by using the corresponding magnification ratio X.

Figure 8:
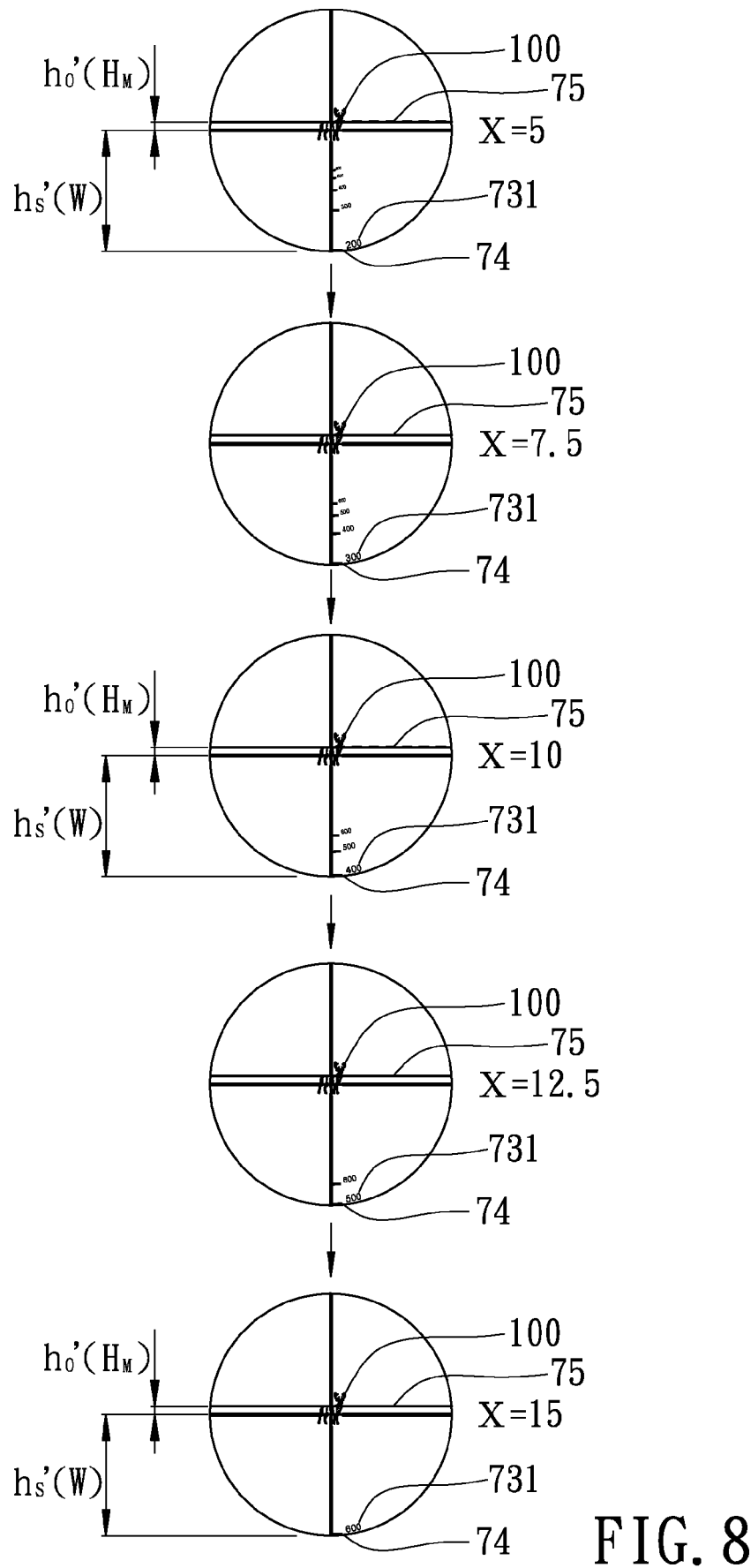
FIG. 8 shows images of the subject seen from an eyepiece lens under different magnification ratios using the first preferred embodiment.

As shown in FIG. 6 and FIG. 8, when the subject 100 is spaced apart by an object distance D1 (200, 300, 400, 500, or 600 yards), the user must adjust the magnifying unit 40 to a corresponding magnification ratio X (5, 7.5, 10, 12.5, or 15), so that the specific height $H_O$ of the subject 100 forms an image height $h_O'$ that is equal to the comparing height $H_M$, and an image of the subject 100 formed on the second imaging plane II has an end that is aligned with the mark 75 in the corresponding magnification ratio X for the user to read.

Referring to FIG. 6 and FIG. 7, the relationship between the scale 73 and the pointer 74 can also be expressed by the following similar imaging formula:

$$h'_S = h_S \times \frac{d_2}{D_2} \times X$$

where $h_S$ denotes the first distance between one of the equidistant distance graduations 731 and the first reference point 711;

d2 is an image distance when the first distance $h_S$ is imaged on the second imaging plane II;

D2 is an object distance when the first distance $h_S$ is imaged on the second imaging plane II;

$h_O'$ is an imaging distance of the first distance formed on the second imaging plane II; and X is one of the magnification ratios.

In this formula: since the imaging distance $h_S'$ (see FIG. 7) is substantially equal to the second distance W, and the second distance W is the radius of the inner periphery of the outer ring 721, the imaging distance $h_S'$ is a known value; each magnification ratio X (5, 7.5, 10, 12.5, 15) is known; and the image distance d2 and the object distance D2 when the first distance $h_S$ is imaged on the second imaging plane II are known. Thus, the first distance $h_S$ between each distance graduation 731 and the first reference point 711 can be calculated to have each of the imaging distances $h_S'$ equal to the second distance W by using the corresponding magnification ratio X.

As shown in FIGS. 6 and 8, when any one of the magnification ratios X (5, 7.5, 10, 12.5, 15) is set, the first distance $h_S$ associated with the corresponding distance graduation 731 is magnified to form an imaging distance $h_S'$ that is equal to the second distance W on the second imaging plane II, such that in any one of the magnification ratios X, an end of an image of the corresponding distance graduation 731 formed on the second imaging plane II is aligned with the pointer 74 to facilitate the user to read the object distance that is represented by each distance graduation 731.

As shown in FIGS. 6, 7, and 8, when the magnifying unit 40 is set to have the specific height $H_O$ of the subject 100 to be magnified to form the image height $h_O'$ that is substantially equal to the comparing height $H_M$ on the second imaging plane II, by comparing the scale 73 and the pointer 74 on the second imaging plane II, the object distance D1 from the subject 100 is known. For example, when the subject 100 is spaced apart by any one of the different object distances (such as 200, 300, 400, 500, and 600 yards), by setting the magnifying unit 40 to a corresponding magnification ratio X (5, 7.5, 10, 12.5, and 15), the user will see an end of the image of the specific height $H_O$ of the subject 100 formed on the second imaging plane II is aligned with the mark 75, and the image of the corresponding distance graduation 731 formed on the second imaging plane II is aligned with the pointer 74, so that the user immediately knows the object distance D1 from the subject 100 is 200, 300, 400, 500, or 600 yards.

Therefore, the present invention has the following advantages:

1. When setting the magnifying unit 40 to one of the magnification ratios X, such that an end of the image of the specific height $H_O$ of the subject 100 formed on the second imaging plane II is aligned with the mark 75 and the reticle 722, the user can easily read the object distance from the subject 100 by alignment between the pointer 74 and one of the distance graduations 731.

2. When the magnifying unit 40 is operated to change the magnification ratio X, the images of the subject 100 and the corresponding distance graduation 731 of the scale 73 formed on the second imaging plane II are magnified or minified synchronously, so that the object distance from the subject 100 is readable by comparison. In this manner, the present invention can achieve the similar range finding function of the laser sighting device but without the requirement of electrical power.

The present invention is exemplified using an optical sight in the first preferred embodiment. However, the impact-point correction unit 50 may be removed so as to become a monocular telescope with range finding function. Moreover, the eyepiece lens assembly 30 may be removed from the present invention, and the user can find the distance from the subject 100 by viewing the second imaging plane II using naked eye.

Figure 9:
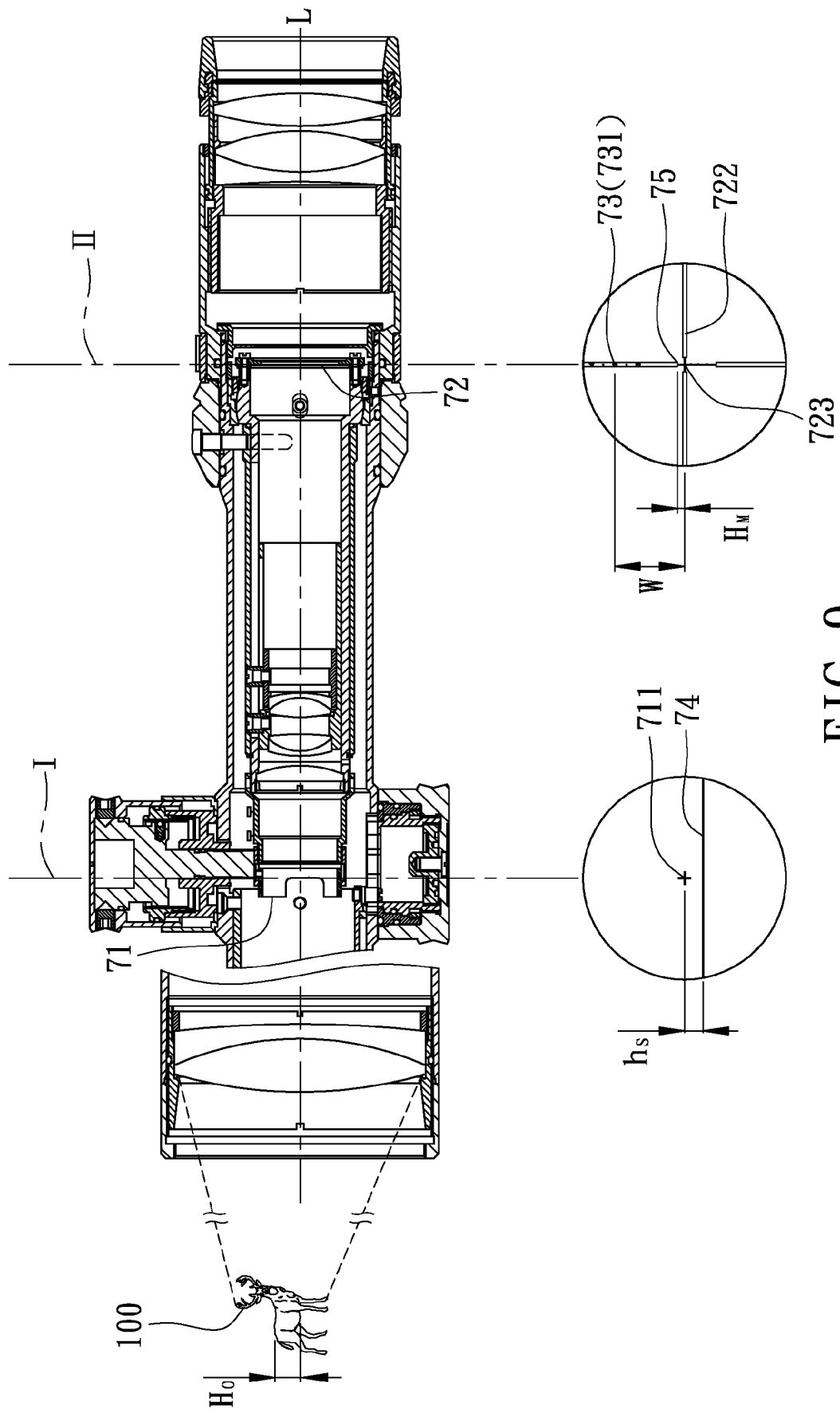
FIG. 9 is a fragmentary sectional view of a second preferred embodiment of the range finder according to the present invention, and illustrates a distance finding action performed on a subject.
Figure 10:
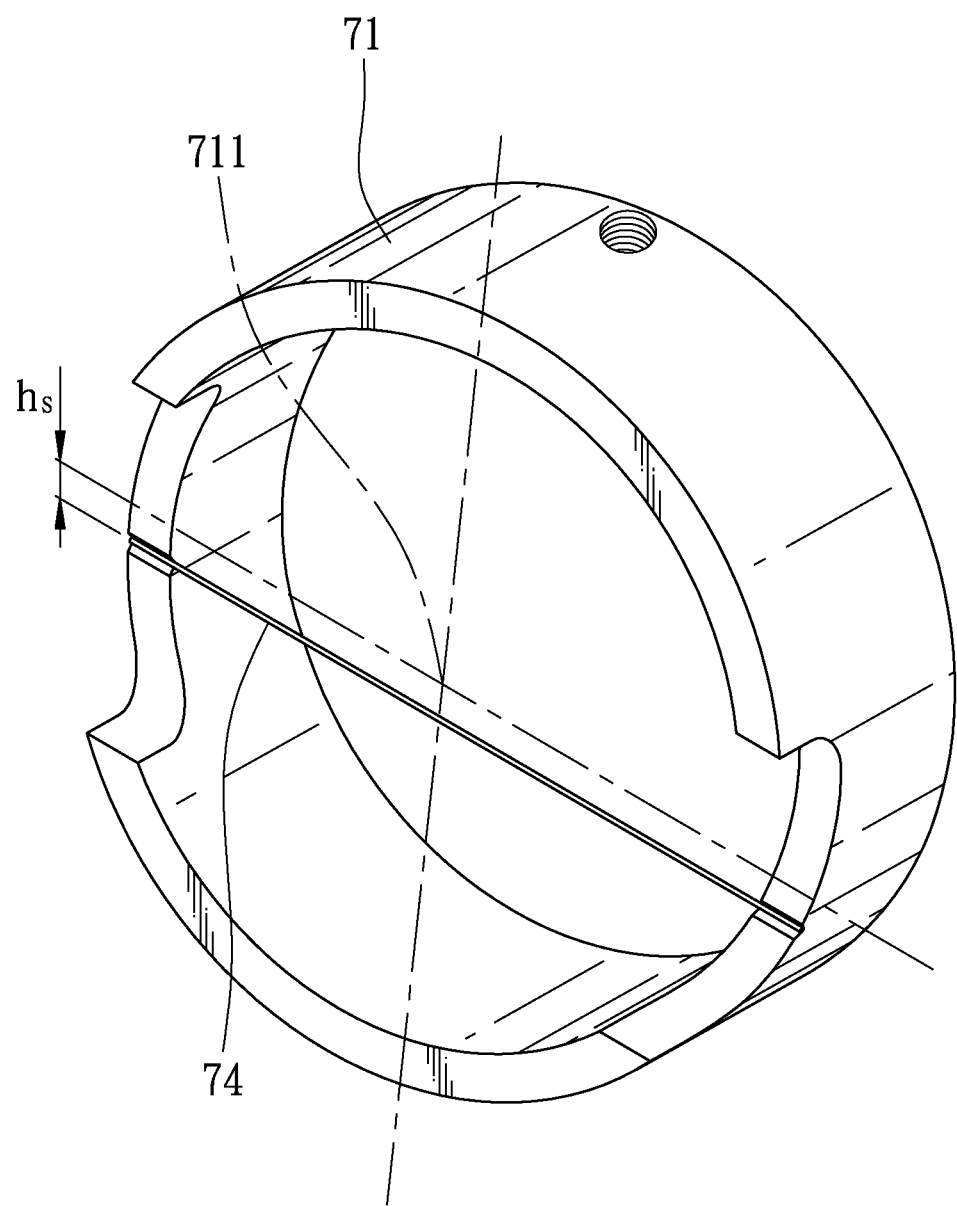
FIG. 10 is a perspective view showing a first comparing component of the second preferred embodiment.
Figure 11:
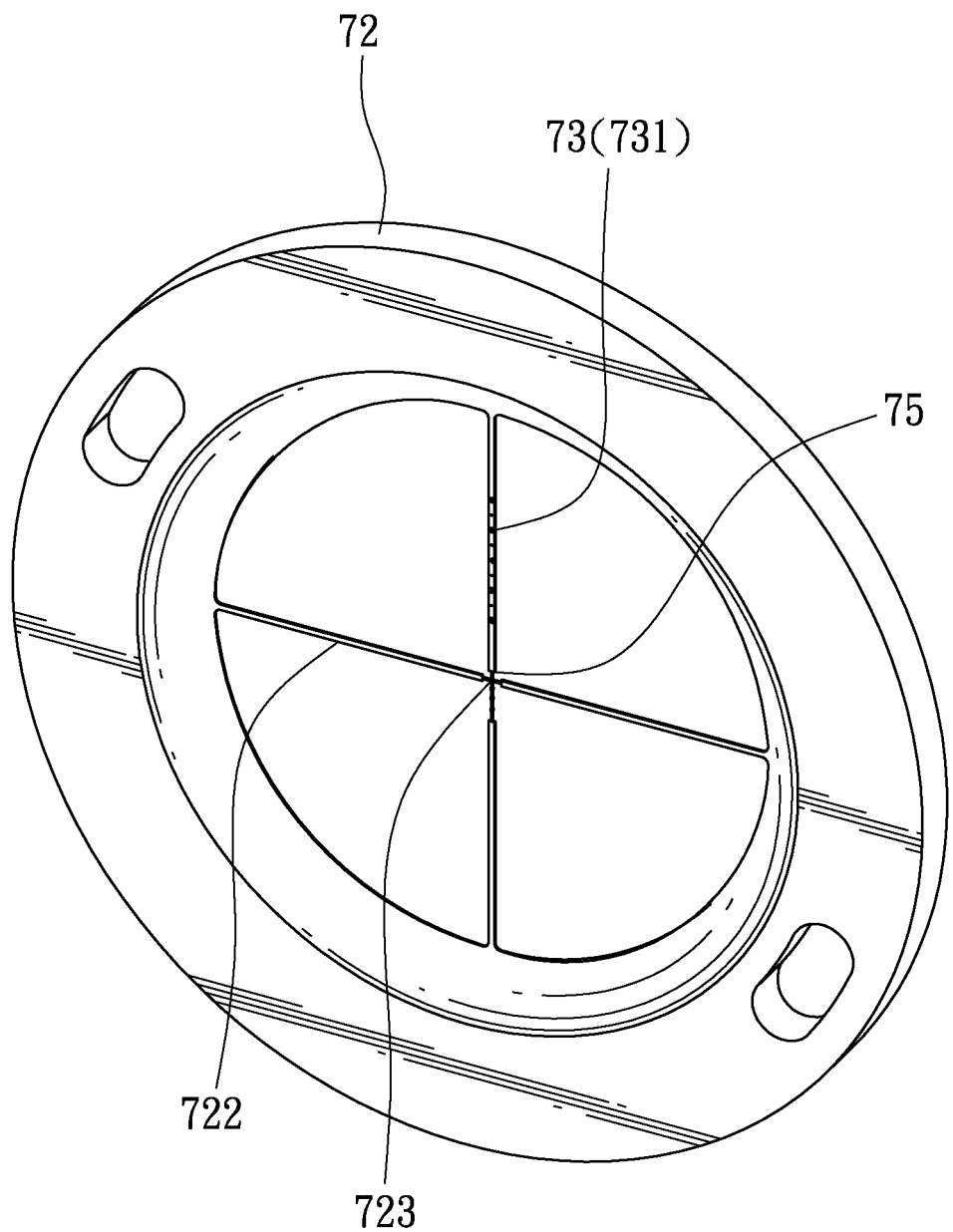
FIG. 11 is a perspective view showing a second comparing component of the second preferred embodiment.

Referring to FIGS. 9, 10, and 11, the second preferred embodiment of a range finder according to the present invention is shown to be similar to the first preferred embodiment. The second preferred embodiment has the following major differences from the first preferred embodiment.

The first comparing component 71 is a barrel frame.

Figure 12:
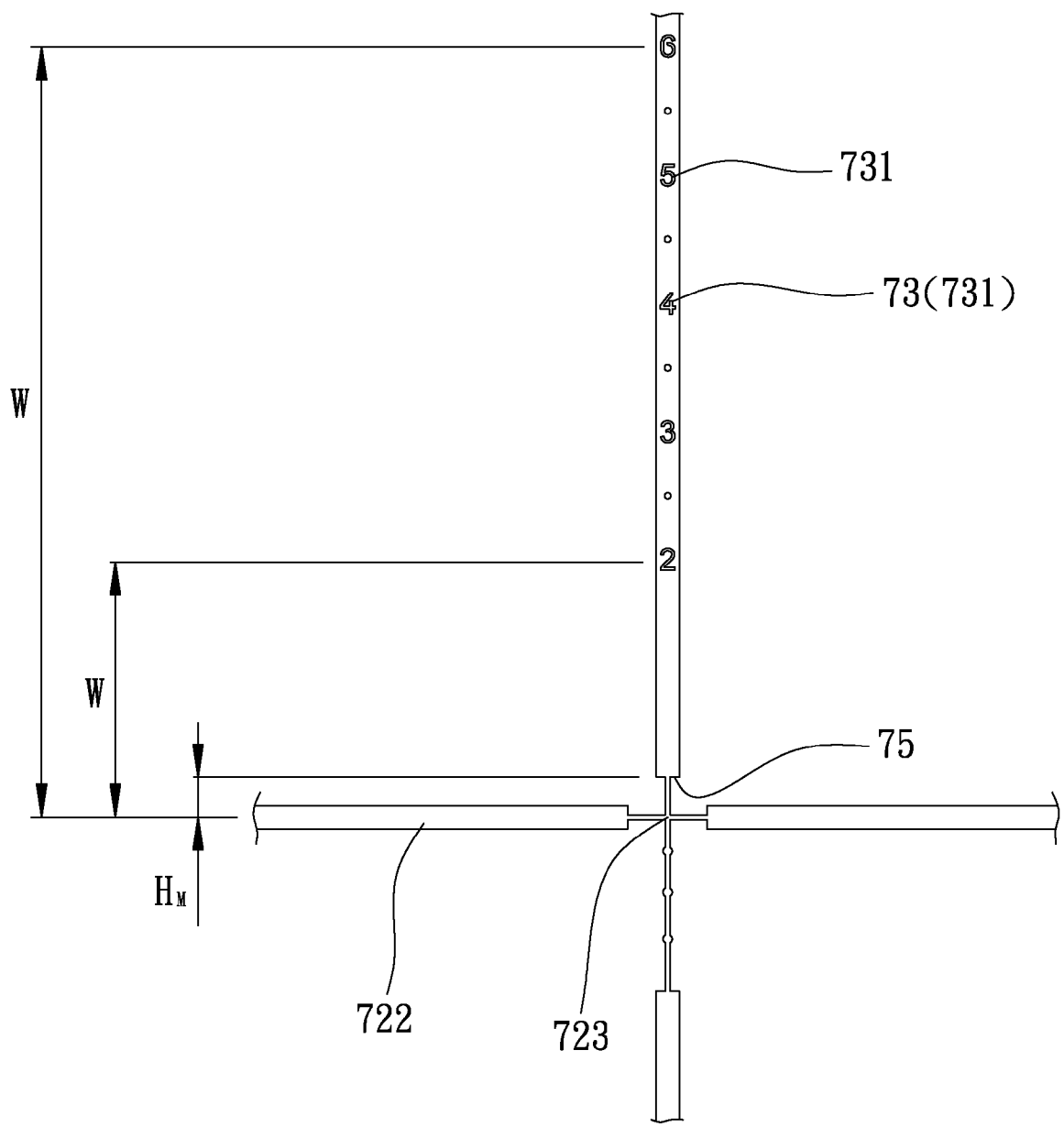
FIG. 12 is a fragmentary front view of the second comparing component of the second preferred embodiment.

The scale 73 is formed on the second comparing component 72. In this embodiment, as shown in FIG. 12, the distance graduations 731 of the scale 73 are equidistantly arranged in a radial direction on the second comparing component 72. Each distance graduation 731 is spaced apart from the second reference point 723 by a second distance W.

The pointer 74 is formed on the first comparing component 71. In this embodiment, the pointer 74 is a metal line disposed on the first comparing component 71 and below the first reference point 711. The pointer 74 is spaced apart from the first reference point 711 by a first distance $h_S$.

The mark 75 is formed above the second reference point 723 and is disposed on a junction between a thick part and a thin part of the reticle 722.

Figure 13:
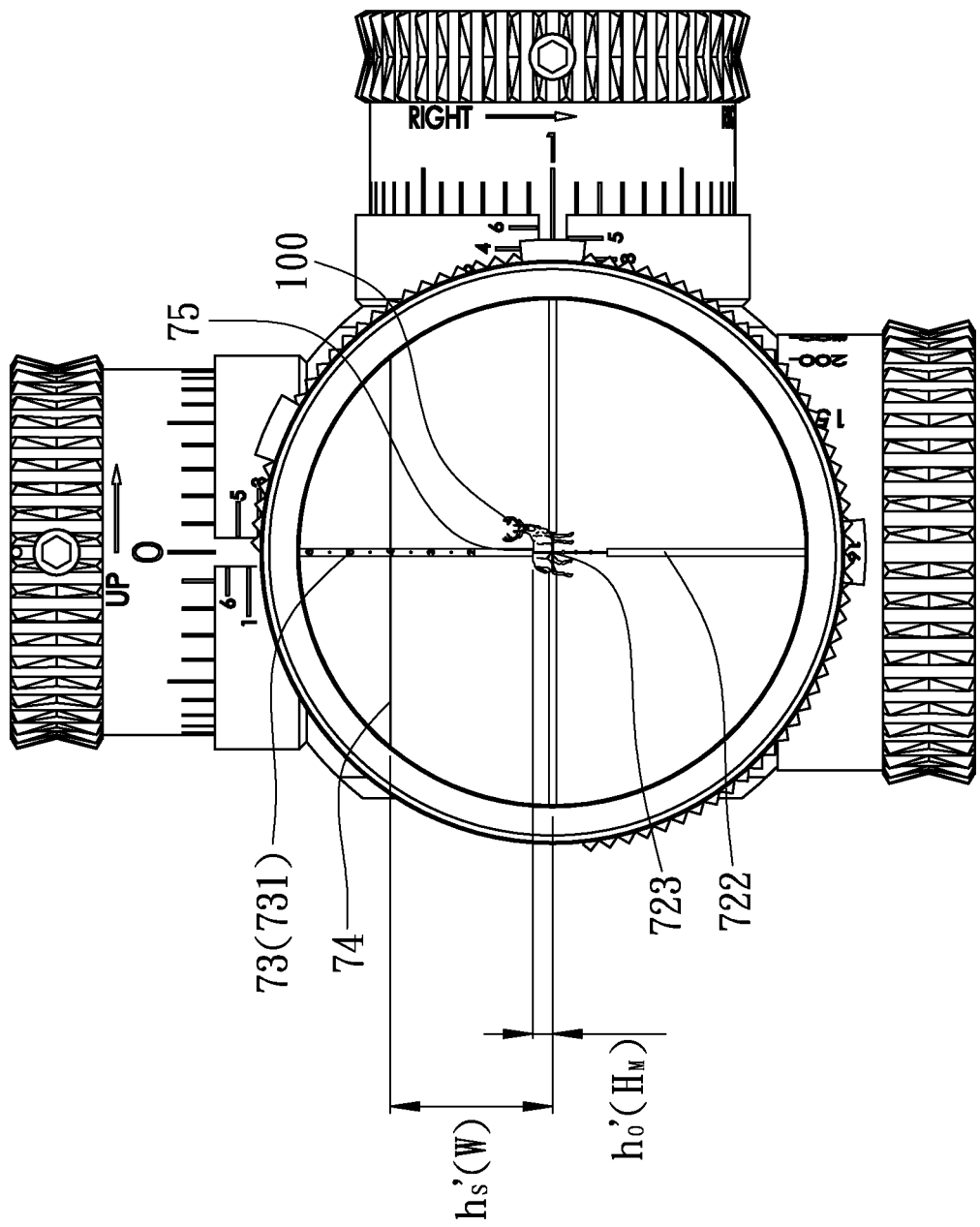
FIG. 13 shows an image of the subject seen from an eyepiece lens under one of the magnification ratios using the second preferred embodiment.

As shown in FIGS. 9 and 13, when the subject 100 is spaced apart by an object distance D1 (200, 300, 400, 500, or 600 yards), the user may adjust the magnifying unit 40 to a corresponding magnification ratio X (5, 7.5, 10, 12.5, and 15), so that the specific height $H_O$ of the subject 100 is magnified to form an image height $h_O'$ that is equal to the comparing height $H_M$, and an image of the subject 100 formed on the second imaging plane II has an end that is aligned with the mark 75 in the corresponding magnification ratio X. At this time, the first distance $h_S$ between the pointer 74 and the first reference point 711 forms an imaging distance $h_S'$ on the second imaging plane II that is substantially equal to one of the second distances W between the second reference point 723 and one of the distance graduations 731, such that an image of the pointer 74 formed on the second imaging plane II is aligned with the corresponding distance graduation 731, so that the user knows the object distance value accordingly. In FIG. 13, the object distance D1 is known as 400 yards by observing the alignment between the pointer 74 and the distance graduations 731 when lower and upper ends of the image height $h_O'$ are aligned respectively with the second reference point 723 and the mark 75.

To sum up, the range finder according to the present invention can be easily used without the requirement of electrical power.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A range finder adapted for finding the distance of a subject from said range finder, the subject having a specific height, said range finder comprising:
   a shell unit having an objective end and an eyepiece end;
   an objective lens assembly disposed on said objective end, and forming a first imaging plane at a first focus position;
   a magnifying unit disposed in said shell unit and between said objective end and said eyepiece end, said magnifying unit forming a second imaging plane behind said first imaging plane at a second focus position, and having a plurality of magnification ratios one of which is selected through operation of said magnifying unit; and
   a range finding unit disposed in said shell unit, and including
      a first comparing component disposed at the first imaging plane and having a first reference point,
      a second comparing component disposed at the second imaging plane and having a second reference point,
      a scale formed on one of said first and second comparing components,
      a pointer formed on the other one of said first and second comparing components, and
      a mark formed on said second comparing component,
   said scale having a plurality of distance graduations each corresponding to a respective one of said magnification ratios and representing an object distance value that is proportional to the respective one of said magnification ratios, said mark being spaced apart from said second reference point by a comparing height, such that when said magnifying unit is set to one of said magnification ratios to allow an image of the subject formed on the second imaging plane to have an image height that is substantially equal to said comparing height, the distance of the subject from said range finder is known by comparing said scale and said pointer that are observed on the second imaging plane.

2. The range finder as claimed in claim 1, wherein said scale is formed on said first comparing component, said pointer being formed on said second comparing component, each of said distance graduations being spaced apart from said first reference point by a respective first distance, said pointer being spaced apart from said second reference point by a second distance, such that when one of said magnification ratios is set, said first distance between a corresponding one of said distance graduations and said first reference point forms an imaging distance on the second imaging plane that is substantially equal to said second distance.

3. The range finder as claimed in claim 2, wherein said second comparing component further has an outer ring, and a reticle connected to and disposed in said outer ring, said second reference point being disposed at an intersection of said reticle, said pointer being formed on an inner periphery of said outer ring.

4. The range finder as claimed in claim 2, wherein said distance graduations of said scale are non-equidistantly arranged in a radial direction on said first comparing component, said object distance values that are represented by said distance graduations decreasing outwardly, said first distances between said distance graduations and said first reference point being inversely proportional to said magnification ratios, font sizes of said distance graduations being inversely proportional to said magnification ratios.

5. The range finder as claimed in claim 1, wherein said scale is formed on said second comparing component, said pointer being formed on said first comparing component, said pointer being spaced apart from said first reference point by a first distance, each of said distance graduations being spaced apart from said second reference point by a respective second distance, such that when one of said magnification ratios is set, said first distance forms an imaging distance on the second imaging plane that is substantially equal to said second distance between a corresponding one of said distance graduations and said second reference point.

6. The range finder as claimed in claim 5, wherein said distance graduations of said scale are equidistantly arranged in a radial direction on said second comparing component.

7. The range finder as claimed in claim 1, wherein said shell unit further has a circumferentially extending slot, said magnifying unit including:
- a first inner barrel extending in an axial direction of said shell unit and swingably disposed in said shell unit, and having a straight guiding groove;
- a second inner barrel rotatably sleeved on said first inner barrel, and having a plurality of camming guiding grooves;
- a plurality of lenses movable in the axial direction in said first inner barrel, each of said lenses corresponding to a respective one of said camming guiding grooves, and having a guiding pin extending into the respective one of said camming guiding grooves through said straight guiding groove;
- a magnification ratio adjusting ring rotatably sleeved on said shell unit; and
- an adjusting pin disposed on said magnification ratio adjusting ring, extending through said slot, and being connected to said second inner barrel;

the first imaging plane being disposed at a front end of said first inner barrel, and the second imaging plane being disposed at a rear end of said first inner barrel.

8. The range finder as claimed in claim 7, further comprising an impact-point correction unit disposed on said shell unit, and including an adjusting component that extends into said shell unit and abuts against said first inner barrel.

9. The range finder as claimed in claim 8, further comprising a focal-length adjusting unit disposed on said shell unit, and having a focal-length adjusting barrel that is movably disposed in said shell unit and in front of the first imaging plane, a focusing lens disposed on said focal-length adjusting barrel, and a focal-length adjusting knobset rotatably disposed on said shell unit, said focal-length adjusting knobset being operable to move said focal-length adjusting barrel in the axial direction in said shell unit.

10. The range finder as claimed in claim 9, further comprising an eyepiece lens disposed on said eyepiece end of said shell unit.

* * * * *